US012668492B2

(12) United States Patent
Kim

(10) Patent No.: US 12,668,492 B2
(45) Date of Patent: Jun. 30, 2026

(54) APPARATUS FOR PRODUCING REDUCED SILICON NANOPOWDER USING LASER

(71) Applicant: KNU-Industry Cooperation Foundation, Gangwon-do (KR)

(72) Inventor: Seong Beom Kim, Gangwon-do (KR)

(73) Assignee: KNU-Industry Cooperation Foundation, Gangwon-do (KR)

( * ) Notice: Subject to any disclaimer, the term of this patent is extended or adjusted under 35 U.S.C. 154(b) by 464 days.

(21) Appl. No.: 18/236,500

(22) Filed: Aug. 22, 2023

(65) Prior Publication Data

US 2024/0067528 A1 Feb. 29, 2024

(30) Foreign Application Priority Data

Aug. 23, 2022 (KR) ........................ 10-2022-0105447

(51) Int. Cl.
*C01B 33/025* (2006.01)
*B23K 26/00* (2014.01)
(52) U.S. Cl.
CPC ........ *C01B 33/025* (2013.01); *B23K 26/0006* (2013.01)
(58) Field of Classification Search
CPC .......................... C01B 33/025; B23K 26/0006
See application file for complete search history.

(56) References Cited

U.S. PATENT DOCUMENTS

2011/0206591 A1* 8/2011 Laine ........................ C22B 5/10
423/349
2017/0190584 A1* 7/2017 Cho ........................ B01J 35/70

FOREIGN PATENT DOCUMENTS

CN 110040734 A * 7/2019 ........... C01B 33/025
DE 102011000543 A1 * 8/2012
KR 102355088 B1 * 2/2022 ........... C01B 33/025

* cited by examiner

*Primary Examiner* — Wayne A Langel
(74) *Attorney, Agent, or Firm* — Harness, Dickey & Pierce, P.L.C.

(57) ABSTRACT

Disclosed is an apparatus for producing reduced silicon nanopowder, comprising: a housing having an inlet port on its top and an outlet port on its bottom; a motor installed in the housing; an annular raw material container installed inside the housing with raw material powder including silica and carbon being loaded and provided with an outer surface spaced apart from an inner surface of the housing, the raw material container rotating by receiving rotational force from the motor; and a laser beam generator for generating laser beams irradiated to the raw material powder of the raw material container through the inlet port. It is possible to load a large amount of raw material powder and thus produce more silicon nanopowder in a continuous process.

8 Claims, 5 Drawing Sheets

APPARATUS FOR PRODUCING REDUCED SILICON NANOPOWDER USING LASER

CROSS REFERENCES TO RELATED APPLICATIONS

The present invention contains subject matter related to Korean Patent Application No. 10-2022-0105447, filed in the Korean Intellectual Property Office on Aug. 23, 2022, the entire contents of which are incorporated herein by reference.

FIELD

The present invention relates to an apparatus for producing reduced silicon nanopowder using laser, and more particularly, to an apparatus for producing reduced silicon nanopowder using laser, capable of efficiently producing silicon by reducing silica by irradiating laser beams.

BACKGROUND

Silicon production is very important because silicon is a core material for solar cells as well as for semiconductor industries. Recently, more silicon is demanded because it is also widely used as negative electrode materials for secondary batteries.

Silicon (Si) is prepared by heating silica ($SiO_2$) powder and carbon powder in a reactor, which is called "carbothermal reduction".

In the carbothermal reduction, a reduction process of removing oxygen from silica ($SiO_2$) is the first reaction step, and its key reaction formula can be expressed as:

$$SiO_2 + 2C = Si + 2CO.$$

The key reaction formula shown above looks very simple. However, in fact, silicon is produced through a slightly complicated process based on the following chemical reaction formula.

$$SiO_2 \ (s) + C \ (s) = SiO \ (g) + CO \ (g)$$

$$2SiO_2 \ (s) + SiC \ (s) = 3SiO \ (g) + CO \ (g)$$

$$SiO_2 \ (s) + Si \ (l) = 2SiO \ (g)$$

$$SiO \ (g) + 2C \ (s) = SiC \ (s) + CO \ (g)$$

$$SiO \ (g) + SiC \ (s) = 2Si \ (l) + CO \ (g)$$

That is, SiC serves as an intermediate reactant in the above reaction, and pure Si is eventually produced through the final reaction formula.

This carbothermal reduction method is a very traditional method and is almost the only process that has been used for a long time. However, there is a limitation in that a large-capacity crucible is indispensable for mass production of silicon. In this regard, the inventors have proposed a novel method and apparatus, which has been registered in Korean Intellectual Property Office (see Patent Literature 1: Korean Patent No. 10-2355088).

However, the silicon manufacturing apparatus of Patent Literature 1 described above is based on a method of injecting raw material powder (silica powder and carbon powder) into a raw material container placed in a stationary state in a fixed place and irradiating laser beams to the raw material powder. Therefore, the amount of raw material powder that can be put into the raw material container is limited, and it is difficult to produce the reduced silicon nanopowder in a continuous process by continuously irradiating laser beams disadvantageously.

In addition, when trying to produce the reduced silicon using the silicon manufacturing apparatus proposed in Patent Literature 1, the reduced silicon powder is loaded into the raw material container, and is deposited on the raw material powder (silica powder and carbon powder). Therefore, it is very difficult to separate only the reduced silicon powder disadvantageously (note that the portion marked brown in FIG. 4 of Patent Literature 1 is the reduced silicon powder).

CITATION LIST

Patent Literatures

Patent Literature 1: Korean Patent No. 10-2355088, "Method for manufacturing silicon using silica reduction and device therefore"

SUMMARY

In order to address the aforementioned problems, the present invention provides an apparatus for producing reduced silicon nanopowder using laser, capable of allowing users to produce a large amount of reduced silicon nanopowder in a continuous process by increasing a loading amount of raw materials and easily separate and obtain the reduced silicon nanopowder.

According to an aspect of the present invention, there is provided an apparatus for producing reduced silicon nanopowder, comprising: a housing having an inlet port on its top and an outlet port on its bottom; a motor installed in the housing; an annular raw material container installed inside the housing with raw material powder including silica and carbon being loaded and provided with an outer surface spaced apart from an inner surface of the housing, the raw material container rotating by receiving rotational force from the motor; and a laser beam generator for generating laser beams irradiated to the raw material powder of the raw material container through the inlet port.

In the apparatus described above, a motor shaft of the motor and the raw material container may be coupled to each other by virtue of magnetic force between first and second magnets provided in the motor and the raw material container, respectively.

In addition, the housing may have a main body having a bottom plate, a side wall protruding upward along an edge of the bottom plate, and a recess recessed upward at the center of the bottom plate to form an insertion space where a motor shaft of the motor is inserted, and a cover detachably installed on the upper end of the side wall of the main body.

In addition, the raw material container may have a supporter spaced apart from the inner surface of the housing and provided with a second magnet, and a crucible seated on the supporter to load the raw material powder.

In addition, the inlet port of the housing may have a gas injection pipe for injecting an inert gas to the inside of the housing.

In addition, the apparatus described above may further have a collector connected to the outlet port to collect reduced silicon nanopowder.

In addition, the collector may have a casing having an injection port connected to the outlet port on one side and a discharge port on the other side, and a filter provided inside the casing to filter out the inert gas introduced through the injection port and the gas generated by the laser irradiation and catch the reduced silicon nanopowder on its surface.

In addition, a suction pump for suctioning the inert gas and the gas generated by the laser irradiation may be provided in the discharge port side of the collector.

In the apparatus for producing reduced silicon nanopowder using laser according to the present invention configured as described above, the raw material powder is loaded on the annular raw material container. Therefore, it is possible to load a large amount of the raw material powder. In addition, since the laser beams are irradiated to the raw material powder stored in the rotating raw material container, it is possible to produce the silicon nanopowder in a continuous process and obtain more silicon nanopowder within the same processing time.

In addition, since the motor shaft of the motor and the raw material container are coupled to each other by magnetic force, it is possible to improve tightness of the housing.

In addition, since the reduced silicon nanopowder is caught on the surface of the filter, it is possible to collect the reduced silicon nanopowder at a desired point and easily separate the silicon nanopowder from the filter.

BRIEF DESCRIPTION OF THE DRAWINGS

The foregoing and additional features and characteristics of this disclosure will become more apparent from the following detailed description considered with reference to the accompanying drawings, wherein.

DETAILED DESCRIPTION

An apparatus for producing reduced silicon nanopowder using laser according to an embodiment of the present invention will now be described in detail with reference to the accompanying drawings.

Figure 1:
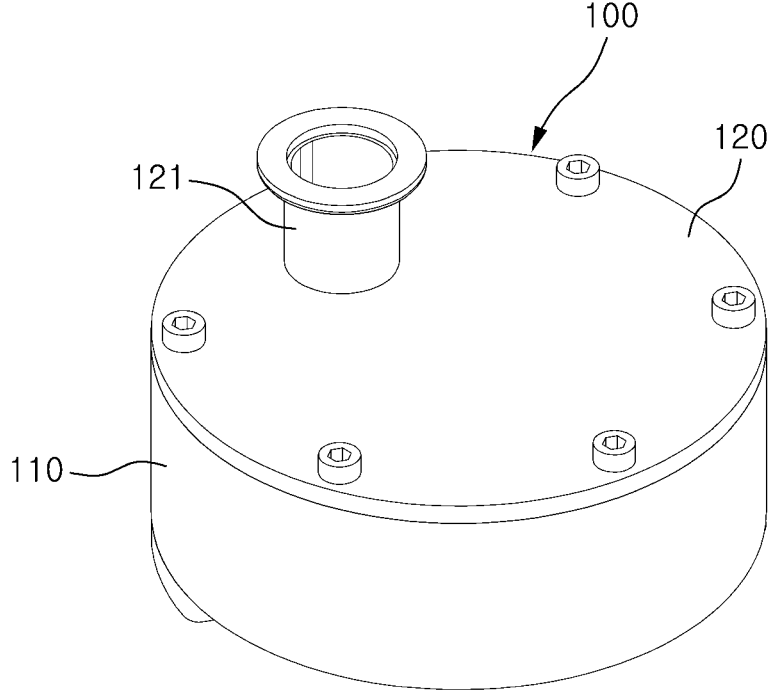
FIGS. 1, 2 and 3 are perspective views illustrating an apparatus for producing reduced silicon nanopowder using laser according to the present invention.
Figure 2:
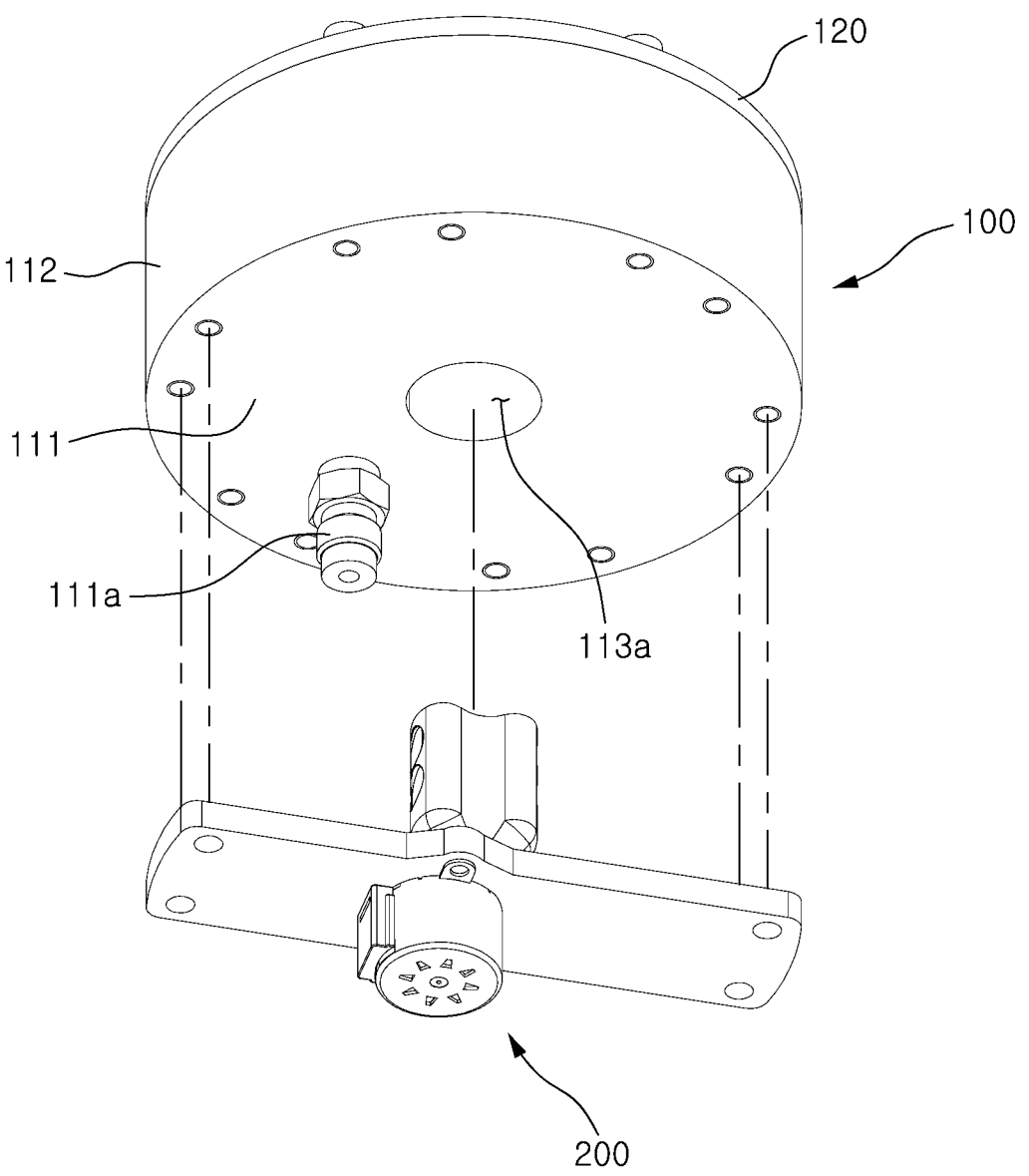
Figure 3:
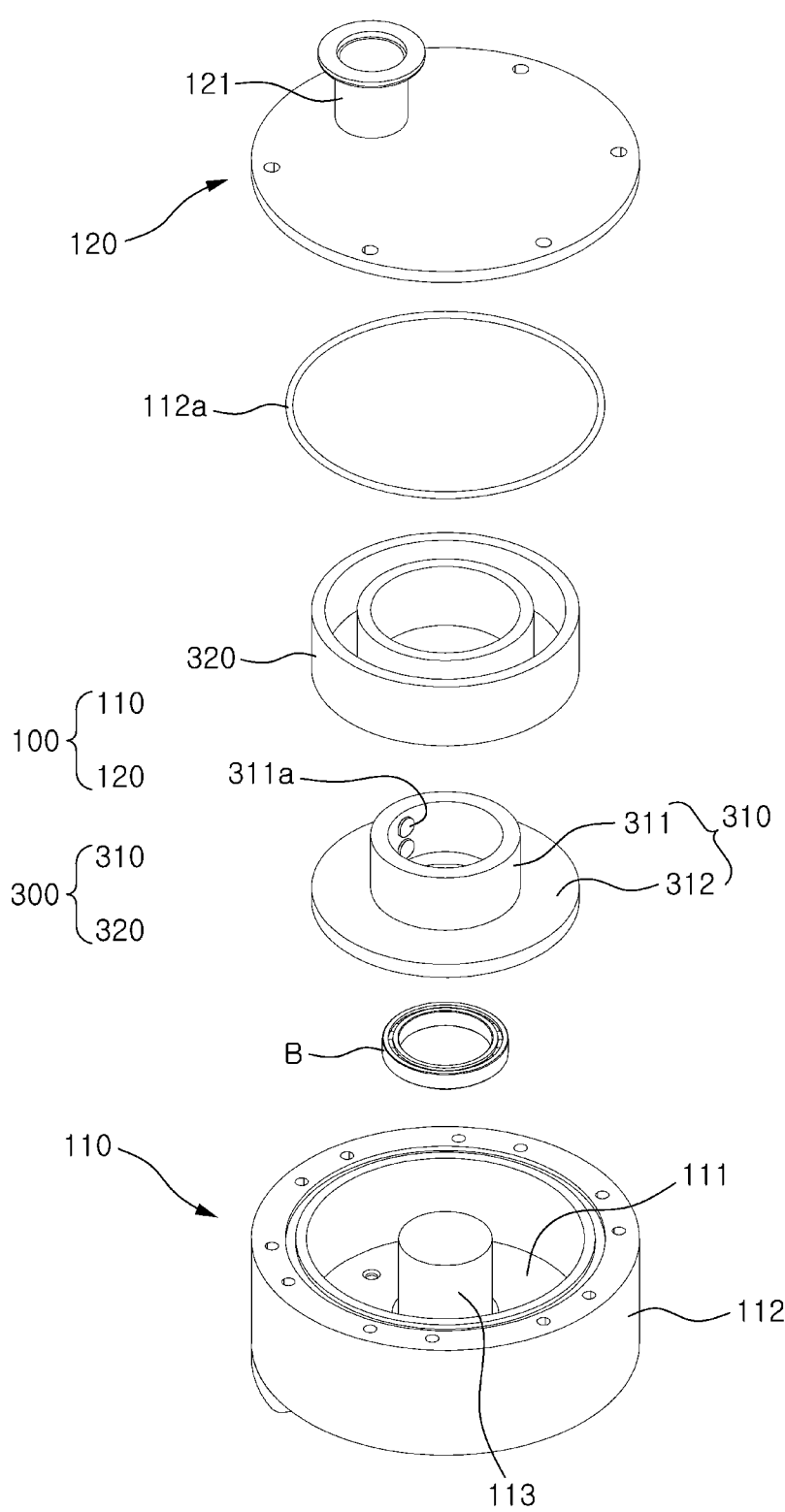
Figure 4:
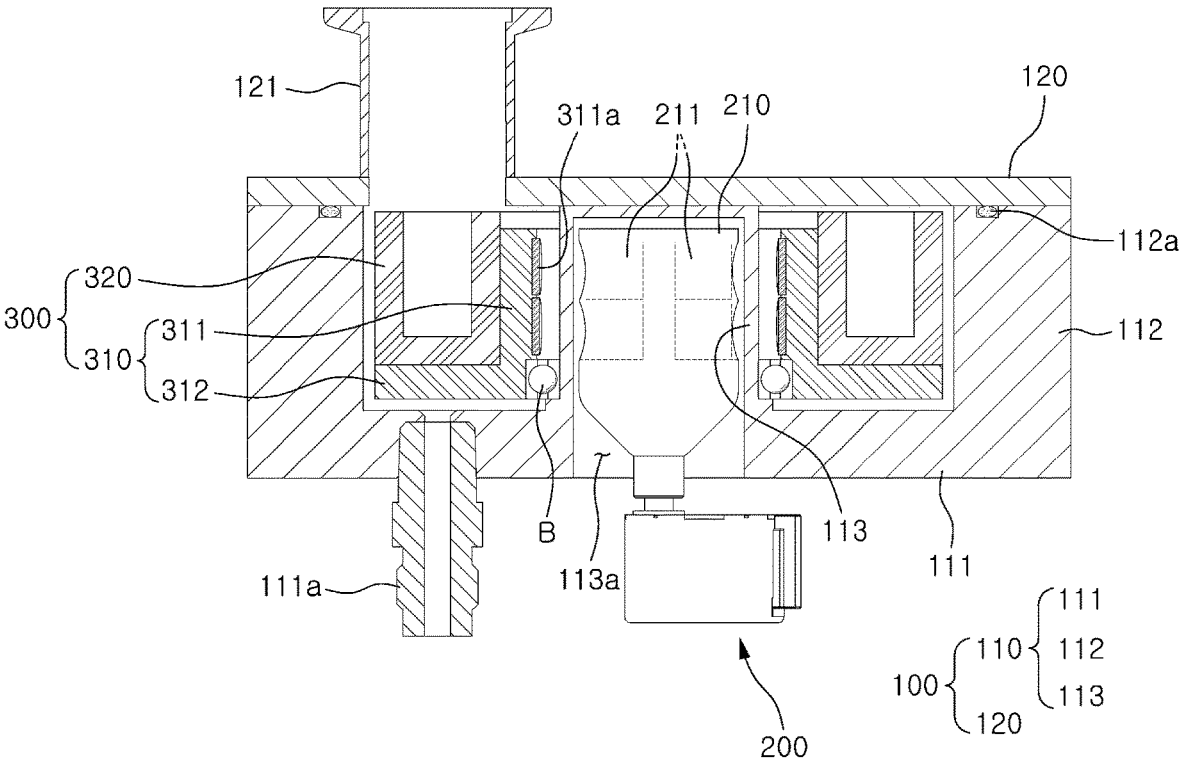
FIG. 4 is a cross-sectional view illustrating the apparatus for producing reduced silicon nanopowder using laser according to the present invention.
Figure 5:
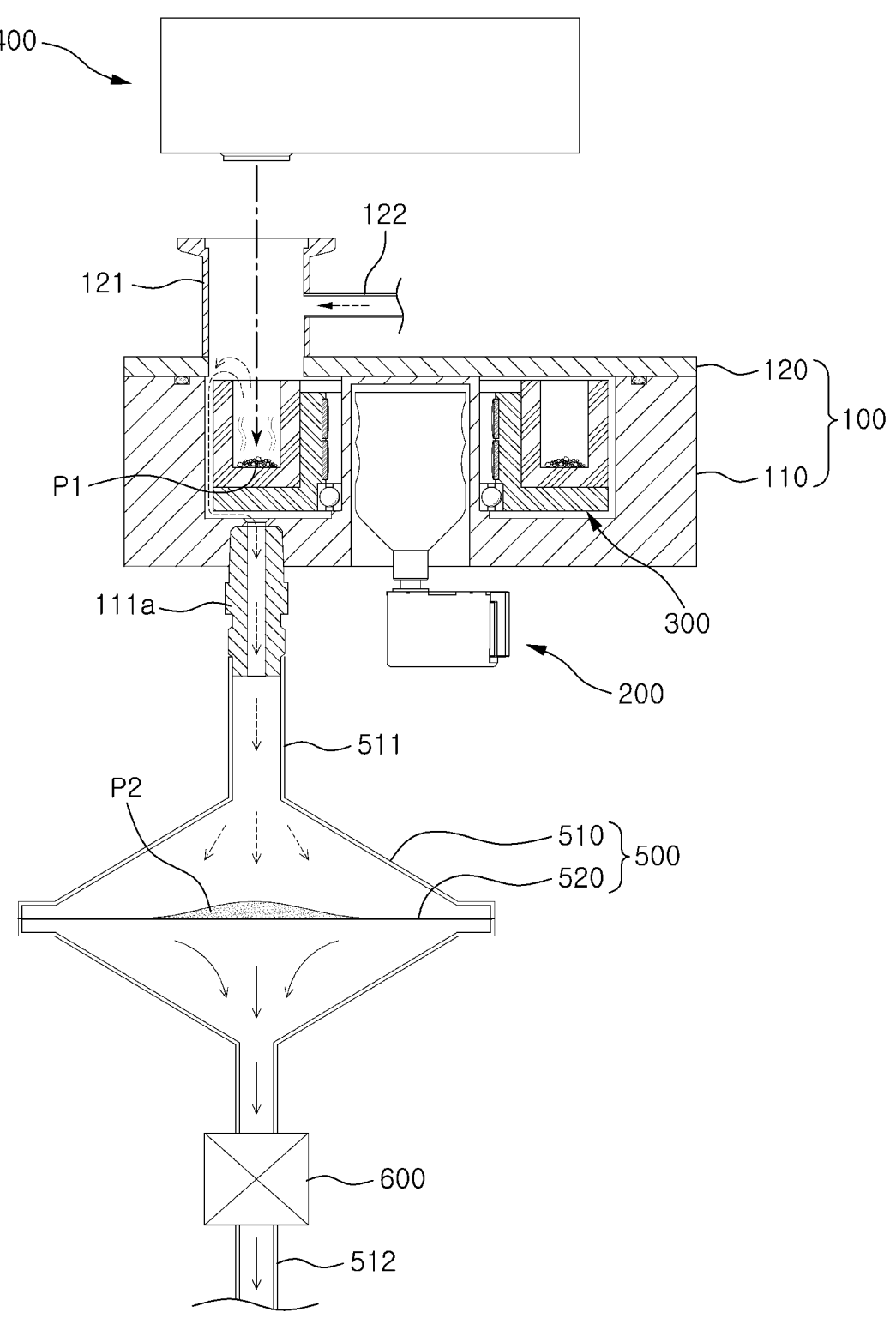
FIG. 5 is a schematic view illustrating a gas flow in the apparatus for producing reduced silicon nanopowder using laser according to the present invention.

FIGS. 1 to 3 are perspective views illustrating an apparatus for producing reduced silicon nanopowder using laser according to the present invention. FIG. 4 is a cross-sectional view illustrating the apparatus for producing reduced silicon nanopowder using laser according to the present invention. FIG. 5 is a schematic view illustrating a gas flow in the apparatus for producing reduced silicon nanopowder using laser according to the present invention.

The apparatus for producing reduced silicon nanopowder using laser according to the present invention includes a housing 100, a motor 200 installed outside the housing 100, a raw material container 300 provided inside the housing 100 with a raw material powder P1 being loaded, a laser generator 400 for generating laser beams irradiated to the raw material powder P1, and a collector 500 for collecting reduced silicon nanopowder P2 by filtering out the gas generated by the laser irradiation of the laser beam generator 400.

The housing 100 has an empty space inside to house the raw material container 300, and has an inlet port 121 provided on the top and an outlet port 111a provided on the bottom.

More specifically, the housing 100 includes a main body 110 having an opened top and a cover 120 detachably installed on the opened top of the main body 110.

The main body 110 includes a bottom plate 111, a side wall 112 protruding upward along the edge of the bottom plate 111, and a recess 113 recessed upward at the center of the bottom plate 111 with a predetermined diameter.

The bottom plate 111 is formed in a circular plate shape, and is provided with an outlet port 111a.

The outlet port 111a is a passage through which an inert gas and the gas generated by irradiating laser beams to the raw material powder P1 is discharged from the housing 100.

The side wall 112 has a circular wall shape, and an O-ring 112a is installed on the top.

The recess 113 is formed at the center of the bottom plate 111 in the shape of an upside down cup having the same diameter, and provides an insertion space 113a with an opened bottom. A motor shaft of the motor 200 is inserted into the insertion space 113a of the recess 113.

The cover 120 is detachably installed on the upper end of the side surface of the main body 110, and is provided with the inlet port 121.

The inlet port 121 is a passage through which the laser beams generated from the laser beam generator 400 pass. The laser beams irradiated to the housing 100 through the inlet port 121 heat the raw material powder P1 to a high temperature. The inlet port 121 has a gas injection pipe 122 for injecting the inert gas into the housing 100.

The motor 200 is installed on the bottom surface of the housing 100. A first magnet 211 is provided on the motor shaft of the motor 200.

More specifically, the motor shaft of the motor 200 has a magnet holder 210 in which a plurality of first magnets 211 are installed, and the magnet holder 210 is inserted into the insertion space 113a of the main body 110 of the housing 100.

The raw material container 300 is installed inside the housing 100 while the raw material powder P1 containing silica and carbon is loaded, and the outer surface is spaced apart from the inner surface of the housing 100. The raw material container 300 is fabricated in an annular shape and rotates inside the housing 100 by receiving rotational force from the motor 200.

More specifically, the raw material container 300 includes a supporter 310 and a crucible 320 seated on the supporter 310.

The supporter 310 is installed inside the housing 100 so that its outer surface is spaced apart from the inner surface of the housing 100. The supporter 310 has a center pipe 311 and a ring portion 312 extending horizontally from the lower end of the outer circumferential surface of the center pipe 311.

The center pipe 311 has a tubular shape where the recess 113 of the housing 100 penetrates. The outer surface of the recess 113 and the inner surface of the center pipe 311 are spaced apart so as to provide a gap. In the vicinity of the outer surface of the center pipe 311, a first magnet 211 provided on the motor shaft of the motor 200 and a second magnet 311a where an attraction force is applied are arranged.

The supporter 310 and the motor shaft of the motor 200 can be coupled to each other from the viewpoint of power transmission by the magnetic force between the first magnet 211 and the second magnet 311a, that is, the attraction force. Accordingly, the supporter 310 can also rotate in synchronization with the rotation of the motor shaft. In this case, even when the motor shaft of the motor 200 rotates, the housing 100 does not rotate, and only the raw material container 300 rotates. Therefore, the housing 100 is preferably made of a non-magnetic material that does not interact with the magnet.

In addition, a bearing B is installed between the center pipe 311 of the raw material container 300 and the recess 113 of the housing 100, so that the outer surface of the recess 113 and the inner surface of the center pipe 311 can be spaced apart, and friction generated in rotation of the raw material container 300 can be minimized.

The crucible 320 is seated on the upper surface of the ring portion 312. This ring portion 312 is also spaced apart from the bottom surface of the housing 100 by a certain distance.

The crucible 320 is made of a graphite material, and has an annular ring shape. The raw material powder P1 including silica and carbon is loaded into the crucible 320.

Specifically, a vertical cross-sectional shape of the crucible 320 is a "U-shape" with an opened top, and the center pipe 311 of the supporter 310 penetrates into the center of the crucible 320.

That is, the inner surface of the crucible 320 having a ring shape is abuttingly fixed to the outer surface of the center pipe 311 of the supporter 310, and the bottom surface of the crucible 320 is abuttingly fixed to the upper surface of the ring portion 312 of the supporter 310. In addition, the outer surface of the crucible 320 is spaced apart from the inner surface of the side wall 112 of the housing 100.

The laser beam generator 400 irradiates laser beams to the raw material powder P1 loaded in the crucible 320 of the raw material container 300 through the inlet port 121 provided in the housing 100. When the raw material container 300 continues to rotate with the rotational force of the motor 200, the laser beam generator 400 continuously irradiates laser beams to the raw material powder P1 loaded in the crucible 320 from the outside of the housing 100. The laser beams irradiated in this manner are not concentrated on the raw material powder P1 at one point by virtue of the rotation of the crucible 320, but are continuously irradiated to different places of the raw material powder P1.

In this case, in the carbothermal reduction process by laser irradiation, when the laser beams are irradiated to the raw material powder P1, the raw material powder (P1) is vaporized by a chemical reaction caused by the energy of the laser beams to generate a large amount of gas. As this gas rises and is hit by the laser beams, it gains energy, and a chemical reaction also takes place. In addition, this process is continuously repeated. Since a lot of chemical reactions occur in this vaporized state, a collector 500 is provided to collect the vaporized substances at a desired point after the sufficient chemical reaction.

The collector 500 is connected to the outlet port 111*a* provided on the bottom plate 111 of the housing 100 to collect the reduced silicon nanopowder P2.

The collector 500 includes a casing 510 and a filter 520 installed inside the casing 510.

The casing 510 has an injection port 511 connected to the outlet port 111*a* provided on the bottom plate 111 of the housing 100 on one side and a discharge port 512 on the other side.

The filter 520 filters out the inert gas introduced through the injection port 511 and the gas generated by the laser irradiation, and catches the reduced silicon nanopowder P2 on the surface.

Meanwhile, a suction pump 600 for suctioning the inert gas and the gas generated by the laser irradiation is installed on the discharge port 512 side of the collector 500.

A process of producing silicon nanopowder in the apparatus for producing reduced silicon nanopowder using laser according to the present invention configured as described above will be described in brief.

While the raw material container 300 rotates by the rotational force of the motor 200, the laser beams generated from the laser beam generator 400 are irradiated to the raw material powder P1 loaded in the crucible 320 of the raw material container 300.

When the laser beams are irradiated to the raw material powder P1, the temperature of the irradiated portion is heated to 2000° C. or higher within one second. As the raw material powder P1 is heated by the laser irradiation in this manner, gases such as CO and SiO are generated by a carbothermal reduction reaction. These gases react with the laser beams to produce silicon in the form of nanoparticles.

Meanwhile, from the start of the operation of the present invention, the inert gas is supplied into the housing 100 through the gas injection pipe 122, and the suctioning pressure is applied toward the collector 500 by the suction pump 600 connected to the collector 500.

In this state, when the silicon nanoparticles are produced by the laser irradiation, these nanoparticles and the inert gas flow toward the outlet port 111*a* through the gap between the housing 100 and the raw material container 300.

The inert gas and the gases caused by laser irradiation, flowing out of the housing 100 through the outlet port 111*a*, are introduced into the collector 500 and then filtered out by the filter 520. Through this filtering process, the reduced silicon nanopowder P2 is collected on the surface of the filter 520.

REFERENCE SIGNS LIST

100: housing
111: bottom plate
111*a*: outlet port
112: side wall
112*a*: O-ring
113: recess
113*a*: insertion space
120: cover
121: inlet port
122: gas injection pipe
200: motor
210: magnet holder
211: first magnet
300: raw material container
310: supporter
311: center pipe
311*a*: second magnet
312: ring portion
320: crucible
400: laser beam generator
500: collector
510: casing
511: injection port
512: discharge port
520: filter
600: suction pump
B: bearing
P1: raw material powder
P2: reduced silicon nanopowder

What is claimed is:

1. An apparatus for producing reduced silicon nanopowder, comprising:

a housing having an inlet port on its top and an outlet port on its bottom;

a motor installed in the housing;

an annular raw material container installed inside the housing with raw material powder including silica and carbon being loaded and provided with an outer surface spaced apart from an inner surface of the housing, the raw material container rotating by receiving rotational force from the motor; and a laser beam generator for generating laser beams irradiated to the raw material powder of the raw material container through the inlet port.

2. The apparatus according to claim 1, wherein a motor shaft of the motor and the raw material container are coupled to each other by virtue of magnetic force between first and second magnets provided in the motor and the raw material container, respectively.

3. The apparatus according to claim 2, wherein the housing has a main body having a bottom plate, a side wall protruding upward along an edge of the bottom plate, and a recess recessed upward at the center of the bottom plate to form an insertion space where a motor shaft of the motor is inserted, and a cover detachably installed on the upper end of the side wall of the main body.

4. The apparatus according to claim 3, wherein the raw material container has a supporter spaced apart from the inner surface of the housing and provided with a second magnet, and a crucible seated on the supporter to load the raw material powder.

5. The apparatus according to claim 1, wherein the inlet port of the housing has a gas injection pipe for injecting an inert gas to the inside of the housing.

6. The apparatus according to claim 5, further comprising a collector connected to the outlet port to collect reduced silicon nanopowder.

7. The apparatus according to claim 6, wherein the collector has a casing having an injection port connected to the outlet port on one side and a discharge port on the other side, and a filter provided inside the casing to filter out the inert gas introduced through the injection port and the gas generated by the laser irradiation and catch the reduced silicon nanopowder on its surface.

8. The apparatus according to claim 7, wherein a suction pump for suctioning the inert gas and the gas generated by the laser irradiation is provided in the discharge port side of the collector.

* * * * *